(12) United States Patent
Homola et al.

(10) Patent No.: US 6,967,798 B2
(45) Date of Patent: Nov. 22, 2005

(54) MAGNETIC RECORDING DISK HAVING DTR PATTERNED CSS ZONE

(75) Inventors: Andrew M. Homola, Morgan Hill, CA (US); Judy Lin, San Jose, CA (US)

(73) Assignee: Komag, Inc., San Jose, CA (US)

( * ) Notice: Subject to any disclaimer, the term of this patent is extended or adjusted under 35 U.S.C. 154(b) by 27 days.

(21) Appl. No.: 10/742,362

(22) Filed: Dec. 19, 2003

(65) Prior Publication Data

US 2005/0134992 A1 Jun. 23, 2005

(51) Int. Cl.$^7$ .................................. G11B 5/09
(52) U.S. Cl. ..................... 360/48; 360/135; 360/75
(58) Field of Search ............... 360/48, 131, 135, 360/55, 75; 428/694 TR, 694 BR, 694 SG

(56) References Cited

U.S. PATENT DOCUMENTS

| | | |
|---|---|---|
| 5,377,058 A | 12/1994 | Good et al. |
| 5,673,156 A | 9/1997 | Chen et al. |
| 5,798,164 A | 8/1998 | Weiss et al. |
| 5,870,250 A | 2/1999 | Bolasna et al. |
| 5,875,083 A | 2/1999 | Oniki et al. |
| 6,020,045 A | 2/2000 | Chen et al. |
| 6,057,984 A | 5/2000 | Arita et al. |
| 6,075,683 A | 6/2000 | Harwood et al. |
| 6,139,936 A | 10/2000 | Weiss |
| 6,330,124 B1 | 12/2001 | Tsukamoto et al. |
| 6,335,080 B1 | 1/2002 | Weiss et al. |
| 6,381,090 B1 | 4/2002 | Suzuki et al. |
| 6,473,259 B1 | 10/2002 | Kuo et al. |
| 6,529,347 B2 | 3/2003 | Hipwell et al. |
| 6,563,673 B2 | 5/2003 | Mundt et al. |
| 6,597,539 B1 | 7/2003 | Stupp et al. |
| 6,627,254 B1 | 9/2003 | Angelo et al. |
| 2002/0024774 A1 | 2/2002 | Berger et al. |
| 2002/0030937 A1 | 3/2002 | Liu |
| 2002/0181153 A1 | 12/2002 | Kang |
| 2004/0101713 A1 * | 5/2004 | Wachenschwanz et al. ............. 428/694 SG |
| 2004/0174630 A1 * | 9/2004 | Nishihira ............... 360/75 |
| 2004/0174636 A1 * | 9/2004 | Suzuki et al. ............ 360/135 |
| 2005/0036223 A1 * | 2/2005 | Wachenschwanz et al. ... 360/48 |

FOREIGN PATENT DOCUMENTS

| | | |
|---|---|---|
| WO | WO02/19330 A1 | 3/2002 |
| WO | WO02/084650 A1 | 10/2002 |

OTHER PUBLICATIONS

Patent Abstracts of Japan, Publication No. 11-273061, Aug. 10, 1999.

(Continued)

*Primary Examiner*—Alan T. Faber
(74) *Attorney, Agent, or Firm*—Blakely Sokoloff Taylor & Zafman LLP

(57) ABSTRACT

A method and apparatus is described for gradually transitioning a slider from operation over a patterned data zone to landing on a patterned CSS zone. The ratio of raised area width to recessed area width of a pattern in a transition zone and/or CSS zone may be varied across the radial dimension of the disk. By changing the ratio of raised area width to recessed area width of the pattern in the transition from slider operation over the data zone to landing in the CSS zone, it is possible to gradually change the height of the slider from flying to non-flying conditions.

39 Claims, 9 Drawing Sheets

OTHER PUBLICATIONS

Patent Abstracts of Japan, Publication No. 2000-251249, Sep. 14, 2000.
Patent Abstracts of Japan, Publication No. 09-167305, Jun. 24, 1997.
Patent Abstracts of Japan, Publication No. 09-081932, Mar. 28, 1997.
Patent Abstracts of Japan, Publication No. 2000-293840, Oct. 20, 2000.
Shoji Tanaka et al, "Characterization of Magnetizing Process for Pre-Embossed Servo Pattern of Plastic Hard Disks", IEEE Transactions on Magnetics, vol. 30, No. 6, Nov. 1994, p. 4209-4211.

* cited by examiner

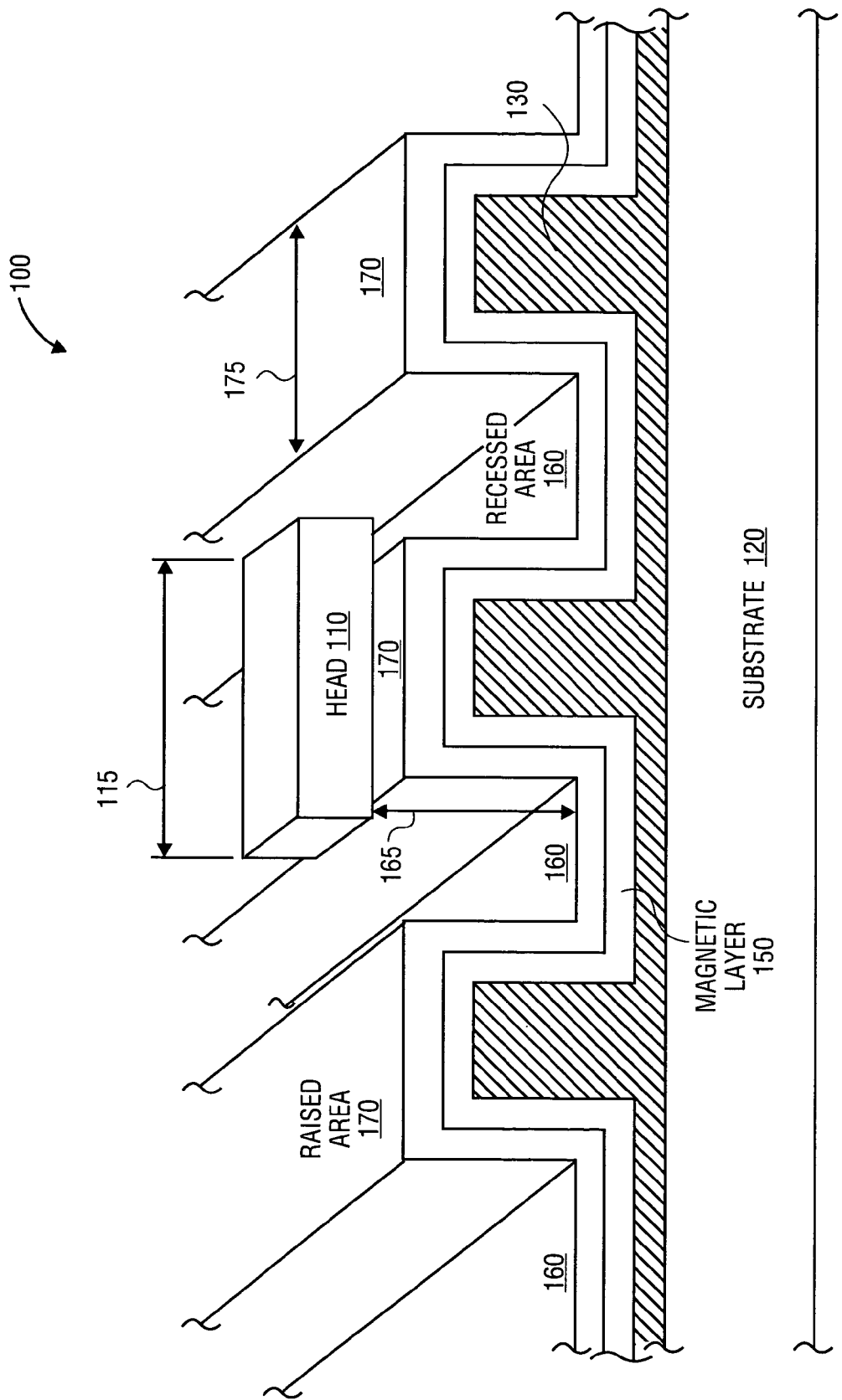

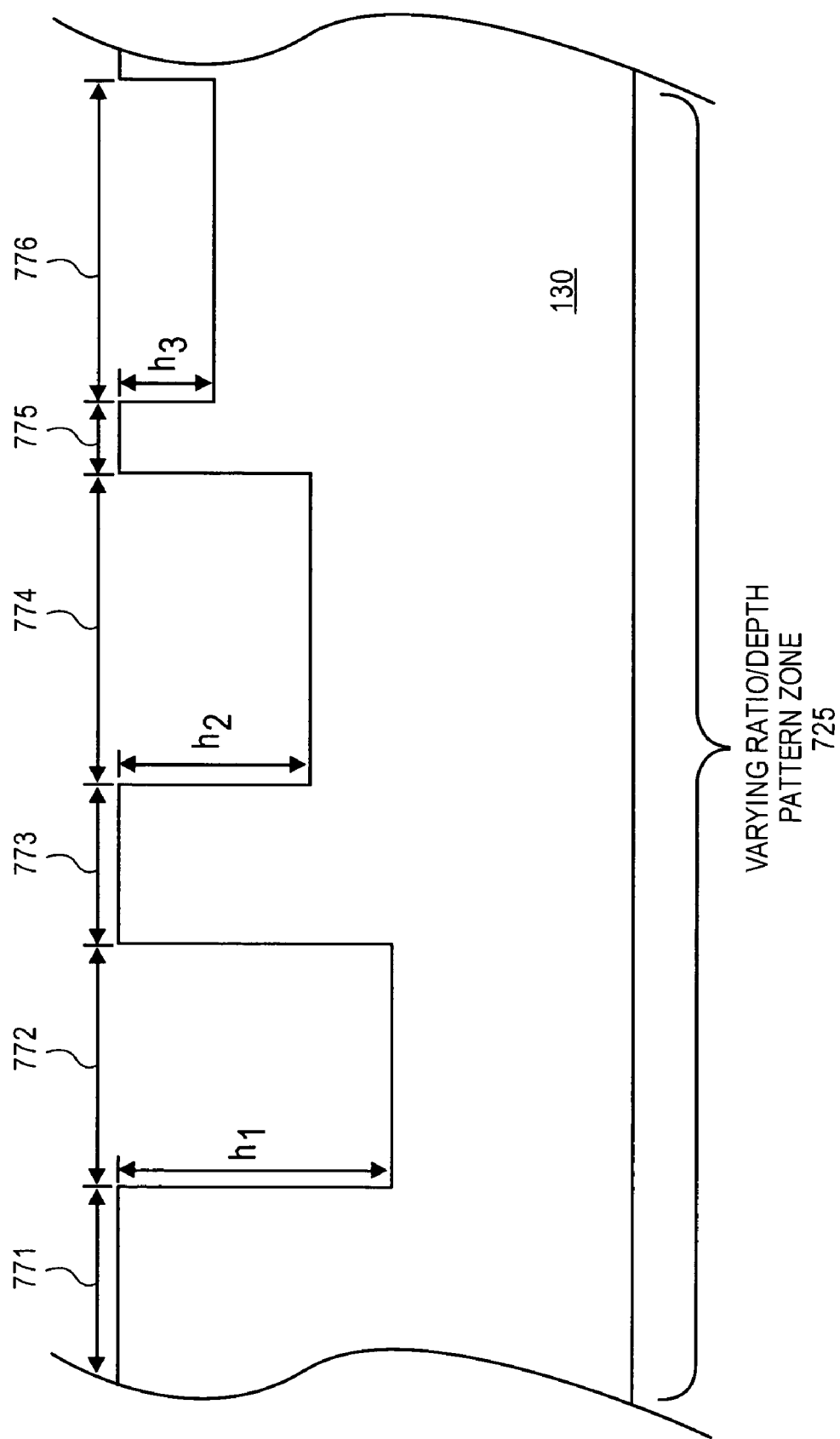

MAGNETIC RECORDING DISK HAVING DTR PATTERNED CSS ZONE

TECHNICAL FIELD

Embodiments of this invention relate to the field of disk drives and, in particular, to the magnetic recording disks used in disk drives.

BACKGROUND

In current disk drive systems that employ flying heads, there is a protective film of air between the head and the disk, where no contact is intended to occur during head read/write operations. The read/write head is typically a part of or affixed to a larger body that flies over the disk and is typically referred to as a "slider." The slider also includes a surface referred to as an air bearing surfaces (ABS). The ABS has aerodynamic effects such as compression or expansion of air to generate positive or sub-ambient pressure. The ABS may include a flat surface, step, cavity, and/or taper. The ABS may also be referred to as a rail in the industry. The slider's body is attached to a suspension arm via a head gimbal assembly that biases the slider body towards the disk. The net effect of the ABS and the suspension arm is to cause the slider and the affixed head to fly at the desired height when the disk is at full speed. The net effect also causes the slider to be in contact with the disk surface, when the disk is at rest, in a contact-start-stop (CSS) zone of a disk in CSS drive systems. The portion of the slider that contacts the disk's surface is typically the aforementioned one or more rails.

CSS drive systems dedicate a portion of the disk's surface, referred to as the CSS zone, for the slider to reside when the drive is not in operation. With this type of system, the slider directly contacts the disk's surface in the CSS zone. The CSS zone interaction between the slider and the disk's surface is of great concern in the reliability of a drive system since it can be the major initiator of failure in hard disk drives. In order to improve the CSS performance, it is well understood that friction must be minimized between the slider and the disk's surface. Static friction, or stiction, is a term used to describe the force exerted against the motion of the slider relative to the disk surface when the slider is at rest on the disk surface. Stiction can be strong enough to prevent the drive motor from turning, or worse yet, can damage the slider by causing the slider to become detached from the suspension assembly or by causing the slider to damage the disk surface during separation of the slider from the disk surface.

One solution intended to reduce stiction when slider contacts occur in contact-start-stop (CSS) drives involves laser texturing of the CSS zone. In laser texturing, a laser beam is focused to a small spot on the disk surface, forming uniformly shaped and sized features, called "laser bumps," in a controllable pattern. The laser bumps reduce the area of contact with the slider, thereby reducing the stiction behavior of the slider and disk surface interface. Although such a solution may reduce the stiction between the slider and disk surface in CSS drives, the laser texturing of a disk's surface is one of the more expensive steps in the manufacturing of magnetic recording disks. The continuing trend to produce low cost disk drives, however, necessitates a reduction in the cost of manufacturing magnetic recording disks.

Another trend in the design of disk drives is to increase the recording density of a disk drive system. Recording density is a measure of the amount of data that may be stored in a given area of a disk. For example, to increase recording density, head technology has migrated from ferrite heads to film heads and later to magneto-resistive (MR) heads and giant magneto-resistive (GMR) heads. Another method for increasing recording densities is to pattern the surface of the disk to form discrete data tracks, referred to as discrete track recording (DTR) disks. DTR disks typically have a series of concentric raised areas (a.k.a. crests, hills, lands, elevations, etc.) storing data and recessed areas (a.k.a. troughs, valleys, grooves, etc.) that provide inter-track isolation to reduce noise. Such recessed zones may also store servo information. The recessed areas separate the raised areas to inhibit or prevent the unintended storage of data in the recessed areas.

One prior method of producing patterned magnetic recording disks is discussed in U.S. Pat. No. 6,627,254. U.S. Pat. No. 6,627,254 describes the manufacture of a disk having patterned data and CSS zones that are formed utilizing embossing techniques. The CSS zone is provided with a pattern of raised and recessed areas to reduce the stiction between the disk's surface and the flying slider. U.S. Pat. No. 6,627,254 describes two types of patterns, a checkerboard pattern and a sinusoidal pattern, both of which have a constant ratio of raised area to recessed area dimensions across the CSS zone. One problem with such a disk is the abrupt topographical change on the surface of the disk when the slider moves into the CSS zone. Abrupt topographical changes on the surface of a magnetic recording disk may affect the flying stability and glide performance of a slider and may also detrimentally affect the reliability of the slider-disk interface.

BRIEF DESCRIPTION OF THE DRAWINGS

The present invention is illustrated by way of example, and not limitation, in the figures of the accompanying drawings in which:

FIG. 1A illustrates a cross-sectional perspective view of one embodiment of a patterned disk and a write element of a head.

FIG. 7 is a cross-sectional view illustrating an embodiment of a disk's patterned zone having a varying ratio of raised area widths to recessed area widths and varying recessed area depths.

DETAILED DESCRIPTION

Figure 1B:
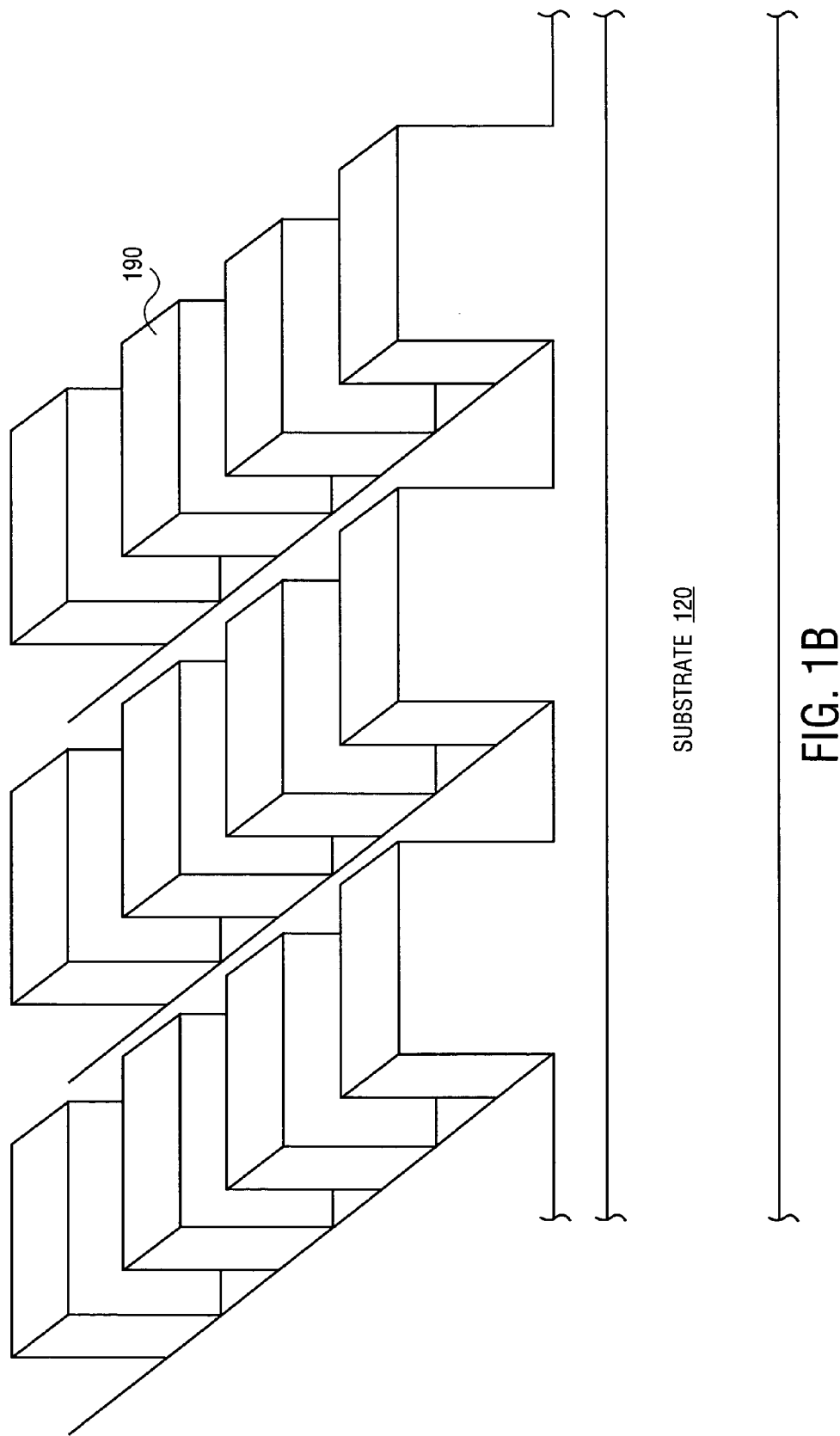
FIG. 1B illustrates a cross-sectional perspective view of an alternative embodiment of a patterned disk.

In the following description, numerous specific details are set forth such as examples of specific materials or components in order to provide a thorough understanding of the present invention. It will be apparent, however, to one skilled in the art that these specific details need not be employed to practice the invention. In other instances, well known components or methods have not been described in detail in order to avoid unnecessarily obscuring the present invention. The term "coupled" as used herein means connected directly to or connected through one or more intervening components.

A method and apparatus is described for gradually transitioning a slider from a flying height over a DTR patterned data zone to a patterned CSS zone. By proper selection of the raised area width to recessed area width ratio in the CSS zone, the stiction between the slider and the disk's surface may be controlled during landing and take-off of the slider. In one embodiment, the ratio of raised area widths to recessed area widths of the pattern in the CSS zone may be varied across the radial dimension of the CSS zone. In another embodiment, a patterned transition zone disposed between the data zone and the CSS zone may be used. The ratio of raised area widths to recessed area widths of the pattern in the transition zone may also be varied across the radial dimension of the transition zone. By changing the raised area width to recessed area width of the pattern in the transition from slider operation over the data zone to the CSS zone, it is possible to gradually change the flying height of the head from flying to non-flying conditions. In this manner, the flying stability and reliability of the slider-disk interface may be improved.

FIG. 1A illustrates a cross-sectional perspective view of a DTR patterned disk and a recording head. The disk 100 includes multiple film layers that have been omitted for clarity of the following discussion. During operation of a disk drive, reading and writing of data on the disk 100 is accomplished by flying, for example, a read-write head 110 over the disk 100 to alter the properties of the disk's magnetic layer 150. To perform a transfer of data with the disk 100, the head 110 is centered above a track of the rotating disk 100. The recording head 110 may be, for example, a dual element head having a read element for performing a read operation and a write element for performing a write operation.

The disk 100 includes a substrate 120 that may be textured, and multiple film layers disposed above the substrate 120. The disks described herein may be manufactured with, by example, a glass substrate or a metal/metal alloy substrate. Glass substrates that may be used include, for example, a silica containing glass such as borosilicate glass and aluminosilicate glass. Metal alloy substrates that may be used include, for example, aluminum-magnesium (AlMg) substrates. In an alternative embodiment, other substrate materials including polymers and ceramics may be used.

The DTR pattern includes recessed areas 160 and raised areas 170. The recessed areas 160 have a depth 165 relative to the recording head 110 and/or raised areas 170. In one embodiment, the width 115 of the head 110 is greater than the width 175 of the raised areas 170 such that portions of the head 110 extend over the recessed areas 160 during operation. However, the recessed areas 160 are sufficiently separated by a distance 165 from the head 110 to inhibit storage of data by the head 110 in the magnetic layer 150 directly below the recessed areas 160. The raised areas 170 are sufficiently close to the head 110 to enable the writing of data in the magnetic layer 150 directly below the raised areas 170. In one embodiment, for example, the width 175 of each raised area may be in the approximate range of 20 to 200 nanometers (nm) and the width of each recessed area may be typically about ½ to ⅓ of the raised areas. A depth 165 of each recessed area, for example, may be on in the approximate range of 5–100 nm. The dimensions discussed above are exemplary and may have other values.

Therefore, when data are written to the recoding medium, the raised areas 170 correspond to the data tracks. Information, such as servo (head positioning) information may be stored in the recessed areas 160. Alternatively, servo information may be interleaved with data in sectors on stored on the raised areas 170. The raised areas 170 and recessed areas 160 are typically formed as alternating concentric circles although other configurations (e.g., spiral) are contemplated. The recessed areas 160 isolate the raised areas 170 (e.g., the data tracks) from one another, resulting in data tracks that are defined both physically and magnetically.

When data are written by the head 110 to a particular data track (raised area 170), data are inhibited from being to adjacent recessed areas 160 because the magnetic layer 150, below the recessed surface areas 160, is too far from the head 110 for the head 110 to induce magnetic transitions there. If new data are written on a subsequent write operation, there should be no residual data from an earlier operation in the raised areas 170 or recessed areas 160. Thus, when the head 110 reads data from a raised areas 170, only data from the preceding write operation is present and read.

It should be noted that various types of discrete track patterns may be generated by stampers in addition to what is illustrated in FIG. 1A. For example, in an alternative embodiment, the discrete track pattern may include data islands as illustrated in FIG. 1B. Each of the data islands 190 may hold a block of data (e.g., one bit or multiple bits) and are isolated from one another by the recessed areas, thereby forming a discrete bit recording pattern. Such a configuration may reduce the amount of noise (e.g., noise between tracks and between blocks of data or bits) that is sensed by the read head 110. In other examples, the recessed and raised areas may have alternative shapes that still isolate data blocks from recessed areas.

The multiple film layers of disk 100 may include a magnetic layer 150 and a layer 130 into which the DTR pattern is formed. In one embodiment, for example, layer 130 may be a NiP layer. In such an embodiment, the discrete track recording pattern is formed into the NiP layer 130 with magnetic layer 150 being disposed above the NiP layer 130. In an alternative embodiment, layer 130 may represent another layer used in the fabrication of magnetic recording disks, for example, a soft magnetic underlayer used for perpendicular recording.

The DTR pattern may be formed by disposing an embossable layer (not shown) composed of, for examples, a photoresist, an electron sensitive resist, or other embossable material above layer 130, and then imprinting the embossable layer with a stamper having a negative replica of the desired DTR pattern. The imprint is followed by a subtractive or an additive process to form the desired DTR pattern in layer 130. In a subtractive process, for example, where layer 130 is a NiP layer, one or more layers disposed above the substrate 120 may be removed (e.g., through imprint lithography and etching) to expose a desired pattern on the NiP layer. Alternatively, the DTR pattern may be formed in substrate 120. In an additive process, for example, where layer 130 is a NiP layer, a material compatible or identical to material forming the initial NiP layer is added or plated to form the raised areas 170 of the discrete track recording pattern.

Imprinting of the embossable layer may utilize lithography techniques, for example, nano-imprint lithography techniques. The imprinting of DTR patterns using nano-imprint lithography techniques is known in the art; accordingly, a detailed discussion is not provided. During the embossing process, one or more patterns of raised and recessed areas may be simultaneously imprinted in the embossable layer residing above a data zone, transition zone and/or a CSS zone of the resulting disk as shown in FIGS. 2 and 3A.

One or more of the layers of disk 100 may be polished, planarized, and/or textured. For example, in one embodiment, where layer 130 is a NiP layer, the NiP may be anisotropically textured with a pattern (e.g., cross-hatch, circumferential), by various methods such as laser texturing or mechanical texturing using fixed or free abrasive particles (e.g., diamond). Certain types of texturing, on the intended data zones of a disk, before deposition of nucleation and magnetic layer may encourage preferred circumferential orientation of the magnetic media on a disk. Preferred circumferential orientation of the magnetic media on a disk aids in achieving optimal signal-to-noise (SNR) and resolution to obtain the best possible performance from the magnetic media. The aforementioned texturing refers to the surface topology of the substantially horizontal recessed areas 160 and raised areas 170 rather than to the gross changes in height associated with the depth of the DTR pattern. Texturing, polishing, and/or planarizing of layers may be performed before and/or after the discrete track recording pattern has been formed. With layer 130 textured and/or patterned with a discrete track recording pattern, other layers (e.g., magnetic layer 150, protection layer) may be disposed above layer 130 to complete the disk manufacturing process, as is known in the art.

Figure 2:
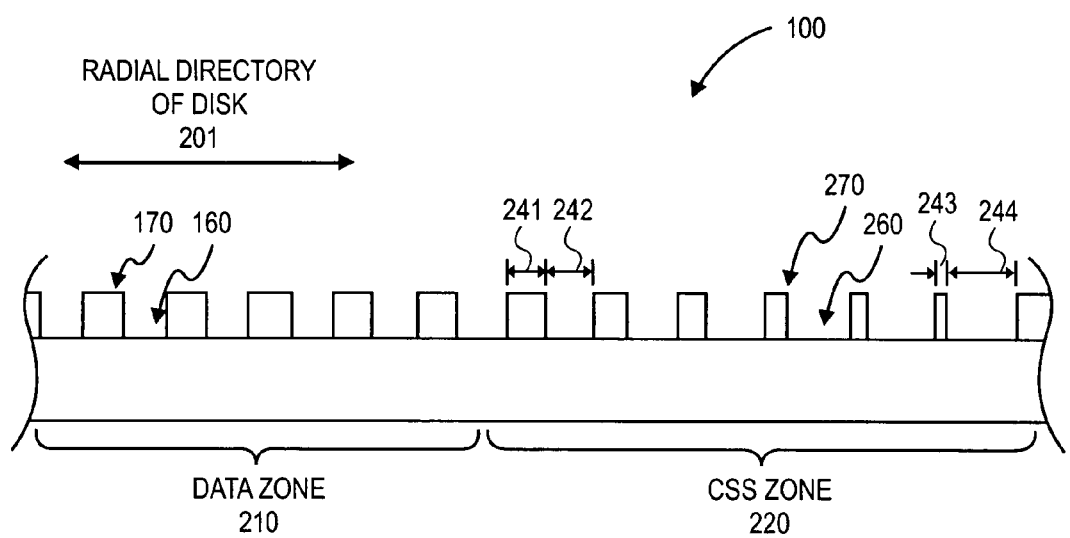
FIG. 2 is a cross-sectional view illustrating one embodiment of a disk having patterned data and CSS zones.
Figure 3A:
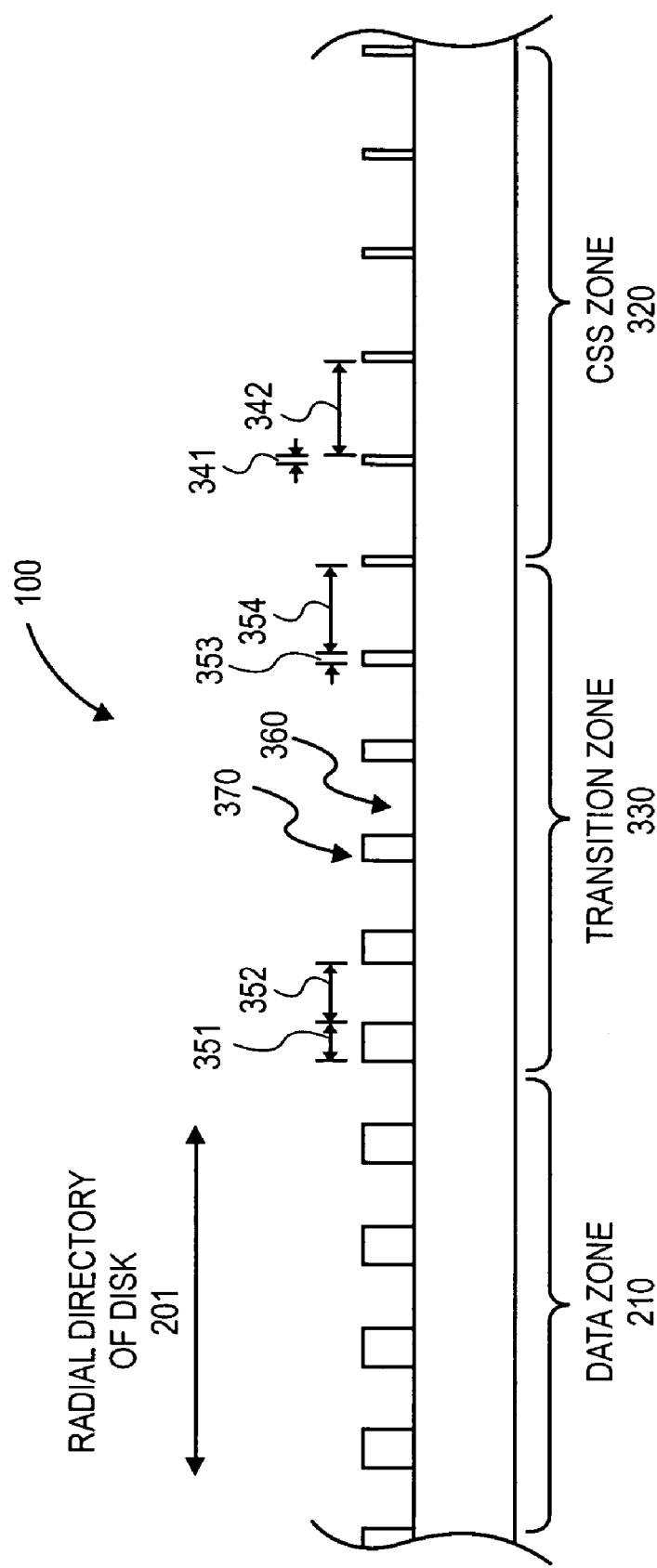
FIG. 3A is a cross-sectional view illustrating an alternative embodiment of a disk having patterned data, transition and CSS zones.

FIG. 2 is a cross-sectional view illustrating one embodiment of a disk having patterned data and CSS zones. In this embodiment, disk 100 includes a data zone 210 having a first pattern of raised areas 170 and recessed areas 160 and a CSS zone 220 have a second pattern of raised areas 270 and recessed areas 260. The first pattern of raised areas 170 and recessed areas 160 in data zone 210 may have a constant ratio of widths. For example, the ratio of the width of the raised areas 170 to the width of the recessed areas 160 may be approximately in the range of 2/1 to 3/1.

In this embodiment, ratio of the raised area 270 widths (i.e., dimension in the radial direction) to recessed area 260 widths varies along the radial direction 201 of the disk across CSS zone 220. For example, the ratio of the width 241 of a CSS zone raised area to the width 242 of a CSS zone recessed area nearest the data zone 210 may be in the approximate range of 2/1 to 3/1. The ratio may decrease along the radial direction 201 of the disk toward the center of the disk with the ratio of the width 243 of a CSS zone raised area to the width 244 of a CSS zone recessed area farthest away from the data zone 210 being, for example, in the range of approximately 1/2 to 1/50. In one exemplary embodiment, width 241 may be on in approximate range of 50 to 300 nm and width 243 may be on the approximate range of 1 to 50 nm. The widths and ratios provided herein are only exemplary. In alternative embodiments, the ratios, widths, and other dimensions may have other values.

Figure 3B:
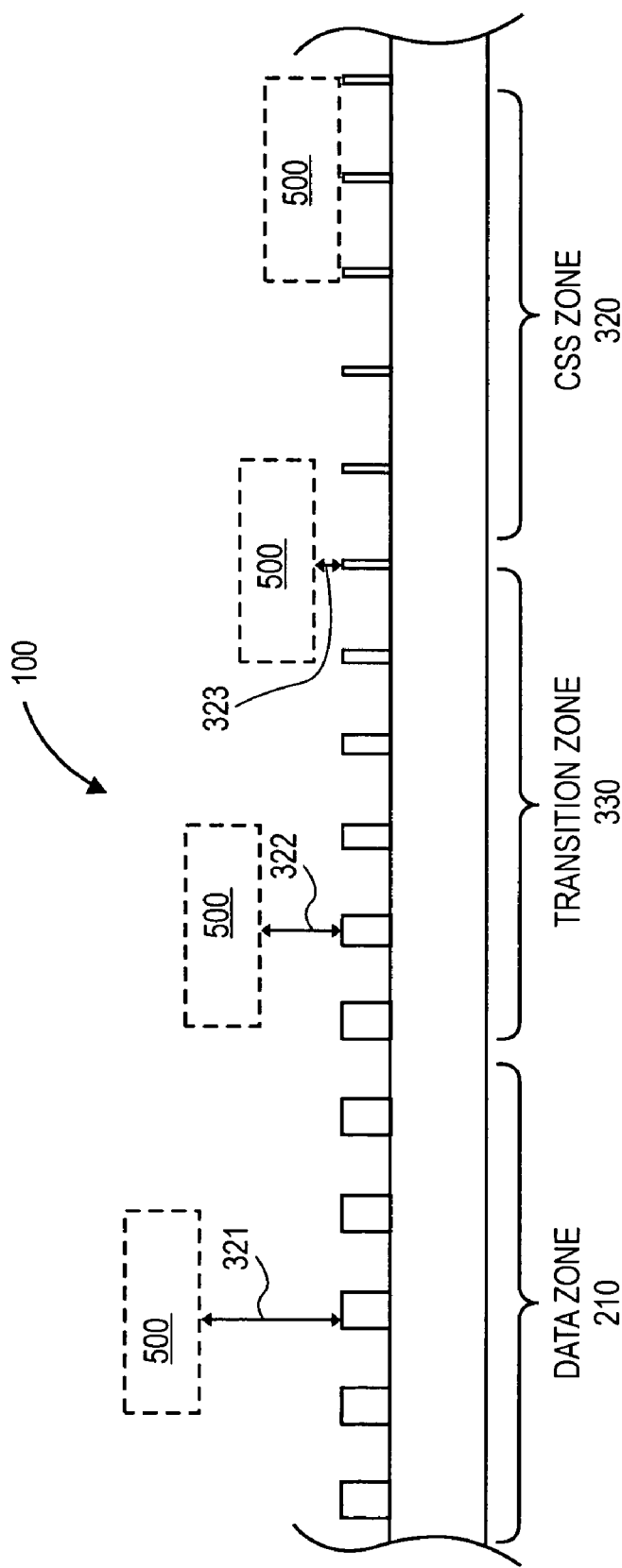
FIG. 3B illustrates the gradually reduction in fly height of a slider over patterned data, transition and CSS zones.

FIG. 3A is a cross-sectional view illustrating an alternative embodiment of a disk having patterned data, transition and CSS zones. In this embodiment, a transition zone 330 may be formed on disk 100 between data zone 210 and CSS zone 320. Transition zone 330 has a pattern of raised areas 370 and recessed areas 360 with a ratio of raised area 370 widths to recessed area 360 widths that varies along the radial direction 201 of the disk across the transition zone 330. By varying the ratio of the raised area widths to recessed area widths of the pattern in transition zone 330, it is possible to gradually change the flying height of the slider from the flying condition over data zone 210 to the non-flying condition over CSS zone 320. As such, slider 500 (having head 110) operates with a fly height 321 over data zone 210, a lower fly height 322 over transition region 330 and an even lower fly height 323 over (just prior to landing on) CSS zone 320, as illustrated in FIG. 3B. In such an embodiment, each of the data, transition and CSS zones has a different dimensioned pattern.

In one embodiment, for example, the ratio of the width 351 of the transition zone raised area to the width 352 of the transition zone recessed area nearest the data zone 210 may be in the approximate range of 1/1 to 2/1. The ratio may decrease along the radial direction 201 of the disk toward the center of the disk with the ratio of the transition zone raised area width 353 to recessed area width 354 area farthest away from the data zone 210 being, for example, approximately in the range of 1/2 to 1/10.

In the illustrated embodiment of FIGS. 3A and 3B, the CSS zone 320 has a constant ratio of raised area widths 341 to recessed area widths 342 across the radial direction 201. In an alternative embodiment, a CSS zone 220 having a varying ratio of raised area widths to recessed area widths may be used in conjunction with transition zone 330 to further gradually reduce the fly height of slider 500 in CSS zone 220 prior to landing on the patterned surface of CSS zone 220.

Figure 6A:
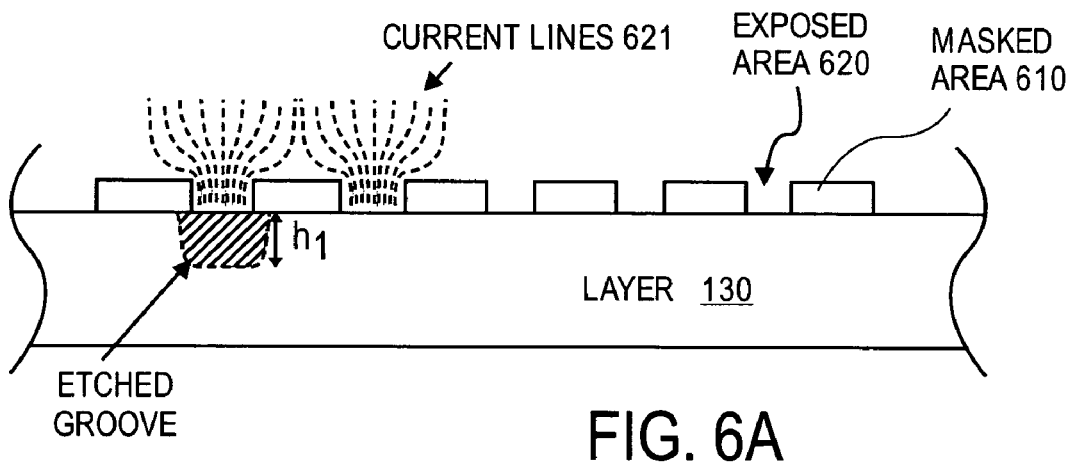
FIGS. 6A–6C illustrate cross sectional views of alternative embodiments of a patterned disk having different recessed area depths.
Figure 6B:
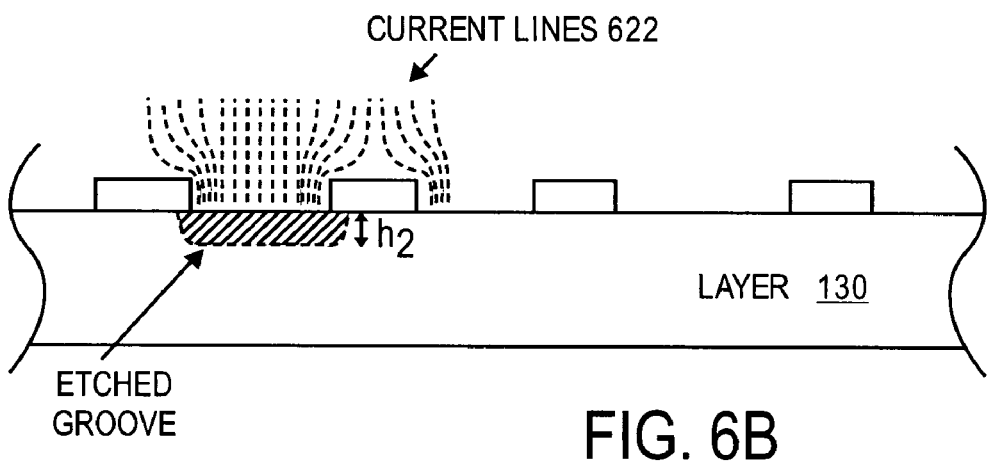
Figure 6C:
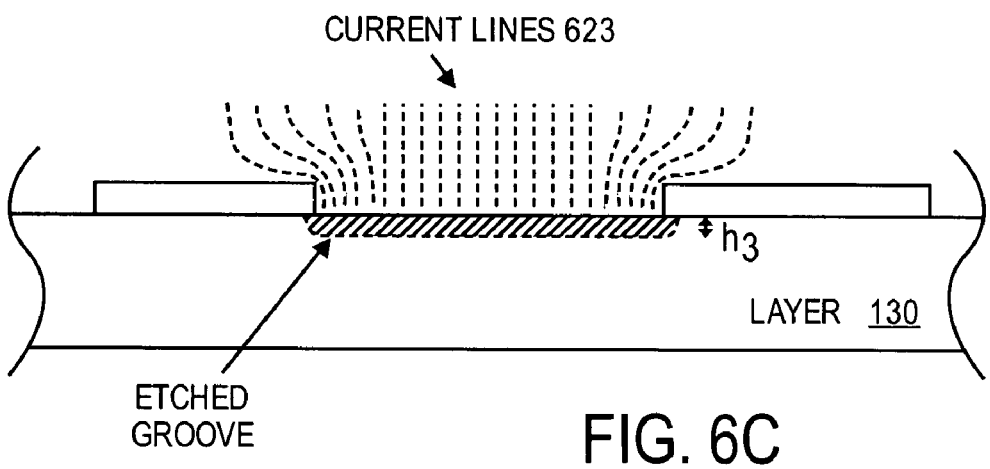

FIGS. 6A–6C illustrate cross sectional views of alternative embodiments of a patterned disk having different recessed area depths. In such embodiments, the depth of the recessed area in one zone (e.g., the CSS zone and/or the transition zone) may be different (e.g., shallower) than the depth of the recessed areas in another zone (e.g., the data zone), or the depth of the recessed areas within a zone (e.g., a transition zone) may be varied across the zone. Changing the depth of the recessed areas in the transition zone and/or CSS zone of a disk may provide an additional parameter with which to control the flying height of a head over the disk. As previously discussed, a DTR may be formed by a subtractive process where layer 130 (e.g., NiP layer) is etched to expose a desired pattern in the layer. A patterned transition and/or CSS zone may be formed by a similar process. In particular, for example, an electro-etching process may be used where a disk substrate having layer 130 is located between two electrode (cathodes). The electro-etching process may be performed in a constant current mode with a fixed current value, in amps per etched disk. The current density on any part of the disk surface changes depending on the ratio of the surface area covered (e.g., masked area 610) by the embossable layer to the area that is free of the embossable layer (e.g., exposed area 620). As the area masked by the embossable layer increases, the current density on the surface of the exposed area also increases (illustrated by current lines 621) leading to more etching and, consequently, to deeper grooves (illustrated by depth of $h_1$) in the exposed areas. This is illustrated in FIGS. 6A through 6C, which show different ratios of masked to exposed areas. The density of current lines 621 is significantly higher in the ratio shown in FIG. 6A than the density of current lines 622 and 623 in the examples shown in FIGS. 6B and 6C, respectively, thereby resulting in a larger depth $h_1$ of the etched areas in FIG. 6A than the depths $h_2$ and $h_3$ of the etched areas in FIGS. 6B and 6C, respectively. As the ratio of the masked areas to exposed areas decreases, the current density decreases proportionally leading to progressively shallower recessed areas as illustrated in FIGS. 6B and 6C. Alternatively, other methods may be used to produce a patterned disk having different recessed area depths.

FIG. 7 is a cross-sectional view illustrating an embodiment of a disk's patterned zone having a varying ratio of raised area widths to recessed area widths and varying recessed area depths. The patterned zone 725 illustrated in FIG. 7 may be a transition zone and/or a CSS zone. For example, the ratio of the raised area width 771 to the recessed area width 772 of patterned zone 725 may be greatest nearest a data zone and decrease in a radial direction away from the data zone. In addition, the depth $h_1$ of the recessed area 772 nearest the data zone may be greatest and the depth of the recessed areas may decrease (e.g., $h_1 > h_2 > h_3$) in a radial direction away from the data zone. In such an embodiment, the ratio of the raised area width 773 to the recessed area width 774 is less than the ratio of raised area width 771 to the recessed area width 772, and the ratio of raised area width 775 to the recessed area width 776 is less than the ratio of the raised area width 773 to the recessed area width 774. Although shown with three different recessed area depths and recessed to raised area width ratios for ease of illustration, the patterned zone 725 may have more or less than these. By varying the depth of the recessed areas of a pattern (e.g., through changes in frequency and width of masked areas in an electro-etching process), it is possible to affect the flying height of the head as it transitions into the CSS zone, or across a transition zone, in a controllable manner.

Figure 4:
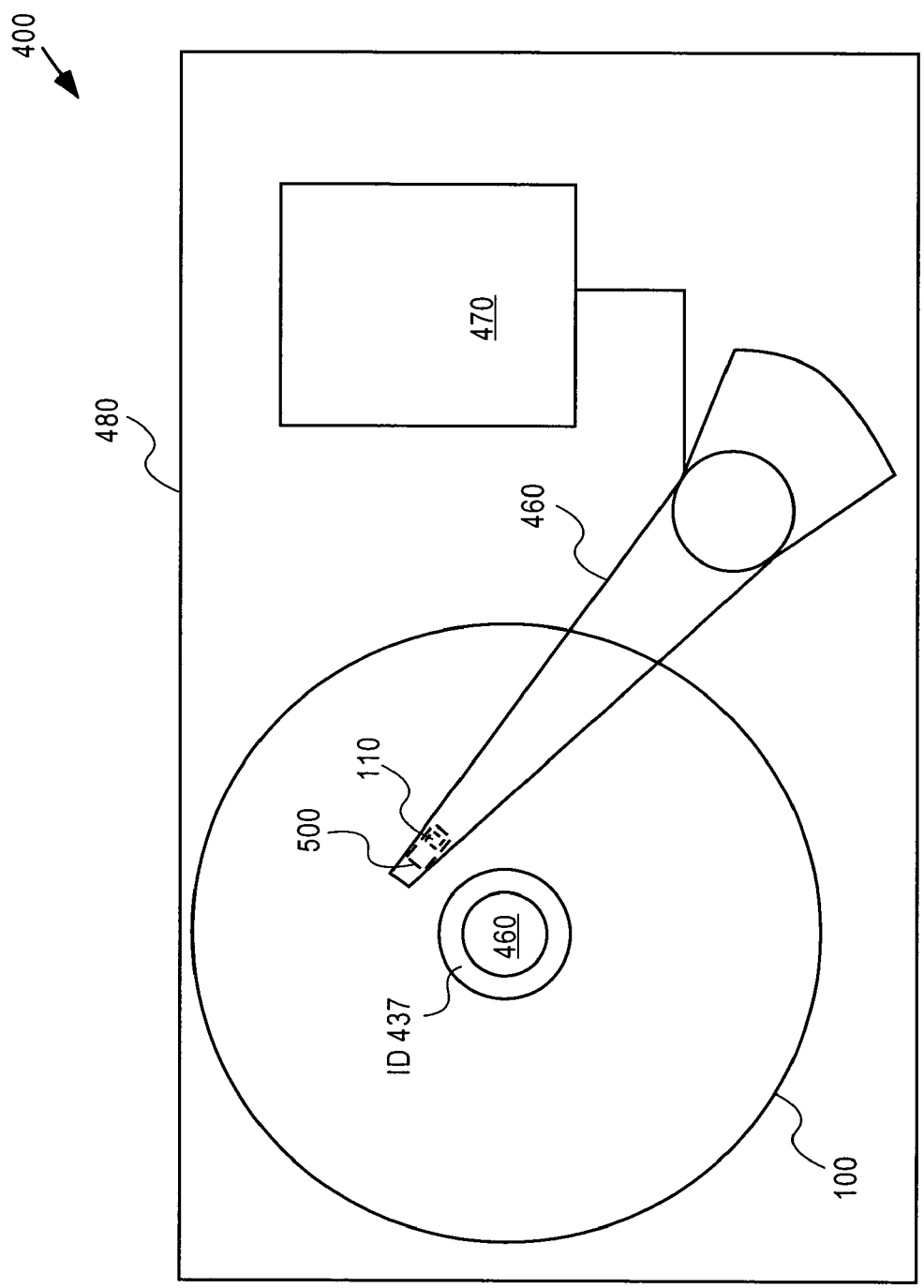
FIG. 4 illustrates one embodiment of a disk drive system having patterned zones.

FIG. 4 illustrates one embodiment of a disk drive including a disk 100 having a pattern CSS zone. Disk drive 400 may include one or more disks 100 to store data along tracks in a magnetic recording layer of disk 430. Each of disks 100 may have a patterned transition and/or CSS zone as discussed above in relation to FIGS. 2, 3A and 3B. In one embodiment, in order to increase the storage capacity of the disk 100, an inner diameter (ID) region 437 on disk 100 may be used for the CSS zone. Alternatively, other regions such as a more central region or an outer diameter (OD) region may be used for the CSS zone.

Disk 430 resides on a spindle assembly 460 that is mounted to drive housing 480. A spindle motor (not shown) rotates spindle assembly 460 and, thereby, disk 430 to position a head 110 on slider 500 at a particular location along a desired disk track. The position of head 110 relative to disk 430 may be controlled by position control circuitry 570.

The slider body 210 is attached to a suspension 460 via a gimbal assembly that load biases the slider body 210 towards the disk 430. The net effect of the air bearing surface 260 of slider 500 and the suspension 460 is to cause the slider 500 to fly at a desired height above disk 430 when the disk is rotating.

Disk drive 400 may be configured to fly slider 500 on either side or both sides of disk 100. Although illustrated with only a single disk and a single side for ease of discussion, disk drive 400 may include double side disks and multiple (single sided and/or double sided) disks in which each side of a disk may have a corresponding slider and suspension arm assembly.

The reading and writing of data is accomplished with head 110 of slider 500. Head 110 includes both read and write elements. The write element is used to alter the properties of the longitudinal or perpendicular magnetic recording layer of disk 430. In one embodiment, head 110 may have a magneto-resistive (MR) and, in particular, a giant magneto-resistive (GMR) read element and an inductive write element. In an alternative embodiment, head 110 may be another type of head, for example, an inductive read/write head or a Hall effect head.

Figure 5:
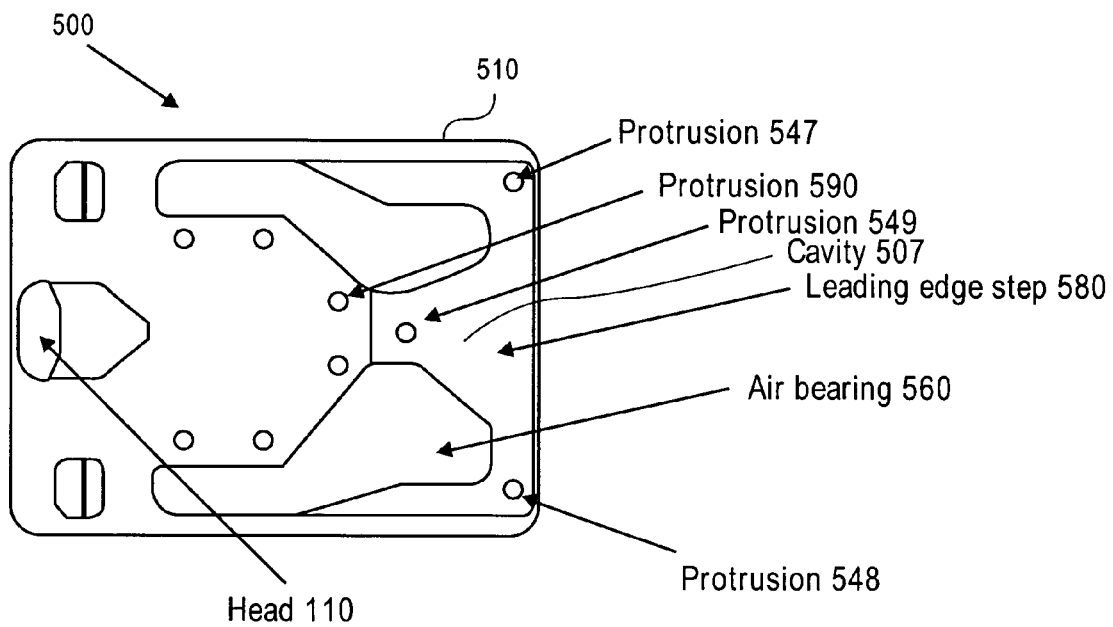
FIG. 5 is an underside view illustrating one embodiment of components of a slider.

Slider 500 may include various components and features to further reduce stiction between slider 500 and the surface of the CSS zone of disk 100, for examples, texturing, a positive crown (longitudinal curvature to the air bearing surface contour), and/or pads on the ABS of the slider (as illustrated in one embodiment in FIG. 5).

FIG. 5 illustrates one embodiment of a slider having a padded ABS. Slider 500 may include a slider body 510, protrusions, head 110, and air bearing surface 560. The slider body 500 is attached to a suspension 460 of FIG. 4 via a head gimbal assembly that load biases the slider body 510 towards the disk 110. The net effect of the air bearing surface 560 and the suspension is to cause the slider 500 to fly at a desired height above disk 100 when the disk is rotating. The air bearing surface 560 may include one or more rails that generate a positive air pressure under slider 500. In addition, slider 500 may include a cavity 507 or similar structure between the rails that creates a sub-ambient pressure to counterbalance the positive pressure generated by suspension arm 460, of FIG. 4, to some extent. Air bearing surfaces and rails are known in the art; accordingly, a more detailed discussion is not provided. In one embodiment, slider 500 may include protrusions (e.g., protrusions 247, 248 and 249, for example, disposed on leading edge step 580) such as pads or a texture that may operate in conjunction with the patterned surface of the CSS zone to further reduce stiction. In one embodiment, slider 500 may also include one or more protrusion on other sections of slider 100, for example, protrusion 590. These additional protrusions may be located closer to head 110, for example, to protect it from contact with the surface of disk 100.

It should be noted again that the widths, ratios and other dimensions provided herein are only exemplary. In alternative embodiments, the ratios, widths, and other dimensions may have other values.

In the foregoing specification, the invention has been described with reference to specific exemplary embodiments thereof. It will, however, be evident that various modifications and changes may be made thereto without departing from the broader spirit and scope of the invention as set forth in the appended claims. The specification and figures are, accordingly, to be regarded in an illustrative rather than a restrictive sense.

What is claim is:

1. A magnetic recording disk, comprising:
   a data zone to store data, the data zone having a first pattern of raised areas and recessed areas; and
   a CSS zone having a second pattern of raised areas and recessed areas, wherein the raised and recessed areas of the second pattern have a varying ratio of widths across a radial dimension of the CSS zone.

2. The magnetic recording disk of claim 1, wherein the first pattern comprises a discrete track recording pattern.

3. The magnetic recording disk of claim 1, wherein the first pattern comprises a discrete bit recording pattern.

4. The magnetic recording disk of claim 1, wherein the raised and recessed areas of the second pattern nearest to the data zone has a first ratio approximately in a range of 2/1 to 3/1.

5. The magnetic recording disk of claim 1, wherein the raised and recessed areas of the second pattern farthest from the data zone has a second ratio approximately in a range of 1/2 to 1/50.

6. The magnetic recording disk of claim 1, wherein each of the recessed areas of the second pattern has a depth, and wherein a plurality of the recessed areas of the second pattern has different depths.

7. The magnetic recording disk of claim 1, further comprising a transition zone having a third pattern of raised areas and recessed areas.

8. The magnetic recording disk of claim 7, wherein the third pattern has a different ratio of raised area widths to recessed area widths than the first pattern.

9. The magnetic recording disk of claim 8, wherein each of the recessed areas of the third pattern has a depth, and wherein a plurality of the recessed areas of the third pattern has different depths.

10. The magnetic recording disk of claim 8, wherein the third pattern has a different ratio of raised area widths to recessed area widths than the second pattern.

11. The magnetic recording disk of claim 8, wherein the third pattern has a varying ratio of raised area widths to recessed area widths across a radial dimension of the transition zone.

12. The magnetic recording disk of claim 11, wherein each of the recessed areas of the third pattern has a depth, and wherein a plurality of the recessed areas of the third pattern has different depths.

13. The magnetic recording disk of claim 11, wherein the raised and recessed areas of the third pattern nearest to the data zone has a first ratio approximately in a range of 2/1 to 1/10.

14. The magnetic recording disk of claim 13, wherein the raised and recessed areas of the third pattern farthest from the data zone has a second ratio approximately in a range of 1/10 to 1/50.

15. The magnetic recording disk of claim 1, wherein at least one of the raised and recessed areas of the second pattern has a ratio approximately in a range of 1/2 to 1/50.

16. A magnetic recording disk, comprising:
a data zone to store data, the data zone having a first pattern of raised areas and recessed areas;
a CSS zone having a second pattern of raised areas and recessed areas different than the first pattern; and
a transition zone disposed between the data zone and the CSS zone, the transition zone having a third pattern of raised areas and recessed areas different than the first and second patterns.

17. The magnetic recording disk of claim 16, wherein the third pattern has a varying ratio of raised area widths to recessed area widths across a radial dimension of the transition zone.

18. The magnetic recording disk of claim 17, wherein each of the recessed areas of the third pattern has a depth, and wherein a plurality of the recessed areas of the third pattern has different depths.

19. The magnetic recording disk of claim 17, wherein the raised and recessed areas of the third pattern nearest to the data zone have a first ratio approximately in a range of 2/1 to 1/10.

20. The magnetic recording disk of claim 19, wherein the raised and recessed areas of the third pattern farthest from the data zone have a second ratio approximately in a range of 1/10 to 1/50.

21. The magnetic recording disk of claim 17, wherein at least one of the raised and recessed areas of the third pattern has a ratio of approximately in a range of 1/2 to 1/50.

22. A disk drive, comprising:
a magnetic recording disk, comprising:
a data zone to store data, the data zone having a first pattern of raised areas and recessed areas;
a CSS zone having a second pattern of raised areas and recessed areas different than the first pattern; and
a transition zone disposed between the data zone and the CSS zone, the transition zone having a third pattern of raised areas and recessed areas different than the first and second patterns; and
a slider comprising a Hall effect head or a head having a magneto-resistance read element operatively coupled to the magnetic recording disk.

23. The disk drive of claim 22, wherein the raised and recessed areas of the third pattern nearest to the data zone have a first ratio approximately in a range of 2/1 to 1/10.

24. The disk drive of claim 23, wherein the raised and recessed areas of the third pattern farthest from the data zone have a second ratio approximately in a range of 1/10 to 1/50.

25. The disk drive of claim 22, wherein at least one of the raised and recessed areas of the third pattern has a ratio approximately in a range of 1/2 to 1/50.

26. The disk drive of claim 22, wherein the slider further comprises a plurality of protrusions extending beyond an air bearing surface of the slider.

27. The disk drive of claim 26, wherein the plurality of protrusions are configured to contact the second pattern raised areas of the CSS zone when the slider is parked on the CSS zone.

28. The disk drive of claim 22, wherein the head has a giant magneto-resistance read element.

29. The disk drive of claim 22, wherein each of the recessed areas of the third pattern has a depth, and wherein a plurality of the recessed areas of the third pattern has different depths.

30. A method of operating a head over a magnetic recording disk, comprising:
operating the head at a first height over a data zone of a disk during at least one of a read operation and a write operation, wherein the data zone comprises a first pattern of raised and recessed areas;
operating the head at a second height in a transition zone of the disk, the second height being less than the first height, wherein the transition zone comprises a second pattern of raised and recessed areas; and
landing the head on a contact-start-stop (CSS) zone of the disk, wherein the landing zone comprises a third pattern of raised and recessed areas.

31. The method of claim 30, wherein the transition zone is a non-data zone.

32. The method of claim 31, wherein at least one of the first, second and third patterns of raised and recessed areas is different than the others.

33. The method of claim 30, wherein at least one of the raised and recessed areas of the second pattern of the transition zone has a ratio approximately in a range of 1/2 to 1/10.

34. The method of claim 30, wherein at least one of the raised and recessed areas of the third pattern of the landing zone has a ratio approximately in a range of 1/10 to 1/50.

35. A method of operating a head over a magnetic recording, comprising:
operating the head at a first height over a data zone, the disk having an inner diameter edge, the disk further having a pattern of raised and recessed areas, each of the raised areas having a width and each of the recessed areas having a width; and
gradually transitioning the height of the head from the first height to land on a CSS zone of the magnetic recording disk using at least two different ratios of raised area widths to recessed area widths across a radial dimension of the magnetic recording disk between the data zone and the inner diameter edge.

36. The method of claim 35, wherein gradually transitioning further comprises using a first ratio of raised area widths to recessed area widths in the data zone and a second ratio of raised area widths to recessed area widths in the CSS zone.

37. The method of claim 36, wherein gradually transitioning further comprises using a third ratio of raised area widths to recessed area widths in a transition zone to reduce the height of the head above the transition zone to a second height being lower than the first height, the transition zone being disposed between the data zone and the CSS zone.

38. A disk drive system, comprising:
   means for operating a head at a first height over a data zone having a pattern of raised and recessed areas, the disk having an inner diameter edge, the disk further having a pattern of raised and recessed areas, each of the raised areas having a width and each of the recessed areas having a width; and
   means for gradually transitioning the height of the head from the first height to land on a CSS zone of a magnetic recording disk using at least two different ratios of raised area widths to recessed area widths across a radial dimension of the magnetic recording disk between the data zone and the inner diameter edge.

39. The disk drive system of claim 38, comprising means for reducing stiction between a slider having the head and the CSS zone.

* * * * *